United States Patent
Bennett et al.

(10) Patent No.: US 7,366,721 B1
(45) Date of Patent: Apr. 29, 2008

(54) METHOD AND APPARATUS FOR DISPLAYING A PLURALITY OF RELATED PRODUCTS TO A USER BASED UPON THE SELECTION OF A MAIN PRODUCT BY THE USER

(75) Inventors: Julie J. Bennett, Portland, OR (US); Adrienne Cleveland, Beaverton, CA (US); Edward Langlois, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 392 days.

(21) Appl. No.: 09/650,362

(22) Filed: Aug. 29, 2000

(51) Int. Cl.
*G06F 17/30* (2006.01)

(52) U.S. Cl. .................... 707/10; 707/3; 707/104.1; 705/27

(58) Field of Classification Search .............. 707/3–5, 707/104.1, 9, 10, 102, 26, 27, 6, 7; 705/26, 705/27; 709/203, 219
See application file for complete search history.

(56) References Cited

U.S. PATENT DOCUMENTS

| | | | | |
|---|---|---|---|---|
| 5,515,488 | A | * | 5/1996 | Hoppe et al. ............... 345/440 |
| 5,905,736 | A |   | 5/1999 | Ronen et al. |
| 5,950,173 | A | * | 9/1999 | Perkowski .................... 705/26 |
| 5,987,457 | A | * | 11/1999 | Ballard ........................... 707/5 |
| 5,999,914 | A | * | 12/1999 | Blinn et al. .................... 705/26 |
| 6,055,516 | A | * | 4/2000 | Johnson et al. ............... 705/27 |
| 6,125,353 | A | * | 9/2000 | Yagasaki ...................... 705/27 |
| 6,236,990 | B1 | * | 5/2001 | Geller et al. .................... 707/5 |
| 6,275,821 | B1 | * | 8/2001 | Danish et al. .................. 707/3 |
| 6,317,722 | B1 | * | 11/2001 | Jacobi et al. ................. 705/14 |
| 6,324,534 | B1 | * | 11/2001 | Neal et al. ...................... 707/3 |
| 6,356,899 | B1 | * | 3/2002 | Chakrabarti et al. ........... 707/5 |
| 6,484,149 | B1 | * | 11/2002 | Jammes et al. ............... 705/26 |
| 6,625,581 | B1 | * | 9/2003 | Perkowski .................... 705/27 |
| 2002/0007322 | A1 | * | 1/2002 | Stromberg .................... 705/26 |

OTHER PUBLICATIONS

Natalia Tsarkova, "Visual Browsing", Massachusetts Institute of Technology Media Lab Thesis, Sep. 1996.

* cited by examiner

*Primary Examiner*—Leslie Wong
(74) *Attorney, Agent, or Firm*—Blakely, Sokoloff, Taylor & Zafman LLP

(57) ABSTRACT

A method and apparatus for a visual browser that allows users to browse products over the Internet. The visual browser creates a plurality of categories in which each category identifies an attribute. Products having at least one attribute are associated with at least one category. Upon the selection of a main product by a user, the visual browser displays other related products having at least one attribute in common with the main product. The visual browser also displays products that are not related to the main product. Also, a weight bias factor is assigned to each category based upon a predefined importance of the respective category of the virtual store. The visual browser by automatically exposing users to other products that are related to the main product originally selected by the user, as well as non-related products, increases the user's exposure to available products and provides opportunities for serendipitous impulse purchases.

12 Claims, 12 Drawing Sheets

METHOD AND APPARATUS FOR DISPLAYING A PLURALITY OF RELATED PRODUCTS TO A USER BASED UPON THE SELECTION OF A MAIN PRODUCT BY THE USER

BACKGROUND

1. Field of the Invention

This invention relates to a method and apparatus for visual browsing that allows users to browse products (e.g. goods and services) over a computer network, such as the Internet.

2. Description of Related Art

The Internet today has become the gateway for connected users to access a plethora of information and interactive services. In particular, the Internet provides users with a medium for ordering various products (e.g. goods and services) that can later be delivered by conventional transport means. For example, a user at a user terminal (e.g. a computer at home or work) can connect through an Internet Access Provider (IAP) to the Internet and access one of a multitude Internet Service Providers (ISP) that provide various products (e.g. goods and services) that the user can view and purchase from the ISP. Typically, the ISP has various computer-based resources to host what is now commonly called an "ecommerce web site" which appealing presents graphical representations of goods and services. The user views these graphical representations of goods and services via their Internet browser on their personal computer and can select and purchase the displayed goods and services from the ISP.

Currently, most ecommerce virtual shopping experiences rely on users explicitly knowing what they are looking for and describing it in verbal ways (i.e. an explicit method). For example, most virtual shopping through today's ecommerce web sites requires a user to search for products by inputting verbal terms, drilling down through a multitude of different categories, or selecting various product attributes stored in a database to finally find a desired product.

On the other hand, most shopping in the real world occurs much less explicitly. For example, a shopper enters a store and navigates generally towards merchandise that the shopper is interested in. As the shopper makes his or her way towards the desired item, the shopper sees a selection of other products along the way, as well as, at the shopper's destination. Alternatively, a shopper may pick up an item, approach a salesperson, and ask the salesperson if the store has anything else similar to the item. These non-explicit methods provide significant advantages to both the merchant and the shopper by increasing the shopper's exposure to available products and providing opportunities for serendipitous impulse buying.

BRIEF DESCRIPTION OF THE DRAWINGS

The features and advantages of the present invention will become apparent from the following description of the present invention in which.

DESCRIPTION

The present invention provides a method and apparatus for a visual browser that allows users to browse products (e.g. goods and services) over a computer network, such as the Internet. The visual browser of the present invention allows a user to navigate a virtual store, without needing to express verbally what they are looking for (i.e. an explicit method), and instead provides non-explicit methods for virtual shopping. In particular, after a user picks a main product, the visual browser automatically presents similar and related products to the user providing opportunities for the user to view and possibly purchase these other related products. To accomplish this, the visual browser creates a plurality of categories in which each category identifies an attribute. Products having at least one attribute are associated with at least one category. Upon the selection of a main product by a user, the visual browser displays other related products having at least one attribute in common with the main product. In other embodiments, the visual browser also displays products that are not related to the main product. Also, in some embodiments, a weight bias factor is assigned to each category based upon a predefined importance of the respective category to the operator of the virtual store. For example, a category for best-selling products may be given a high weight bias factor. The visual browser by automatically exposing users to other products that are similar or related to the main product originally selected by the user, as well as non-related products, increases the user's exposure to available products and provides opportunities for serendipitous impulse purchases.

In the following description, the various embodiments of the present invention will be described in detail. However, such details are included to facilitate understanding of the invention and to describe exemplary embodiments for implementing the invention. Such details should not be used to limit the invention to the particular embodiments described because other variations and embodiments are possible while staying within the scope of the invention. Furthermore, although numerous details are set forth in order to provide a thorough understanding of the present invention, it will be apparent to one skilled in the art that these specific details are not required in order to practice the present invention. In other instances details such as, well-known methods, procedures, components, electrical structures and circuits, are not described in detail, or are shown in block diagram form, in order not to obscure the present invention. Furthermore, the present invention will be described in particular embodiments but may be implemented in hardware, software, firmware, middleware, or a combination thereof.

Figure 1:
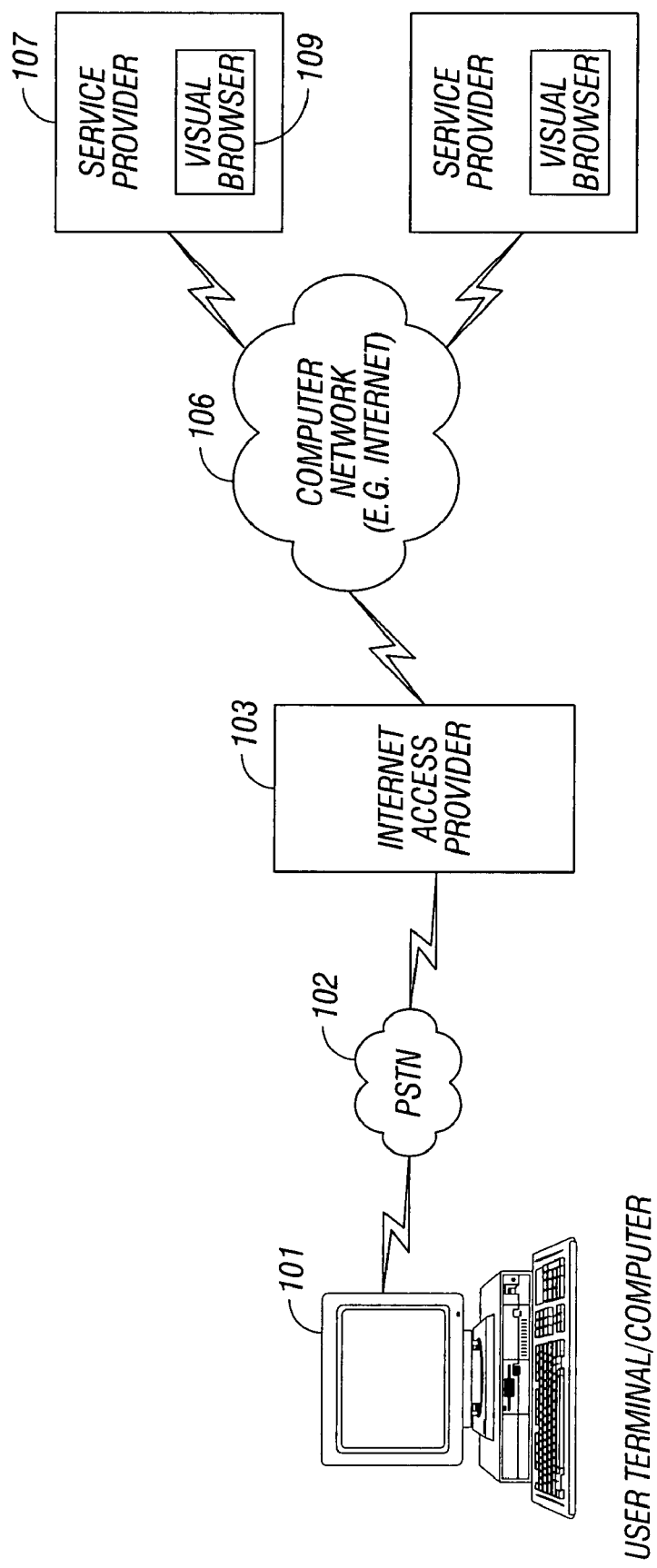
FIG. 1 is a diagram illustrating an exemplary computer network environment in which one embodiment of the invention can be practiced.

FIG. 1 is a diagram illustrating an exemplary computer network environment in which one embodiment of the invention can be practiced. A user's terminal/computer 101 (e.g. terminal device connected to a network, personal computer, network computer, palm pilot, personal digital assistant, e.g. or any type of computing device that can access a network) is connected through to an Internet Access Provider (IAP) 103. As illustrated, the user computer 101 is connected through the public switched telephone network 102. However, it should be appreciated that the connection may be through any of a number of communication systems (such as cable, Digital Subscriber Line (DSL), Integrated Services Digital Network (ISDN), satellite connection, or other types of public or private networks). The IAP 103 provides a connection to a computer network 106, such as the Internet. The LAP 103 may connect with the Internet 106 using any available protocol including for example the well-known PPP (point-to-point protocol). PPP is a recognized "official" Internet protocol used to exchange IP frames over a serial link. Of course, alternative protocols may be utilized including, for example, the serial Internet protocol (SLIP), the compressed serial line Internet protocol (CS-LIP), frame relay, IP over ATM, or SONET.

Thus, a user at the computer 101 can connect through an Internet Access Provider (IAP) 103 to the Internet 106 and access one of a multitude Internet Service Providers (ISP) 107 that provide various products (e.g. goods and services) that the user can view and purchase from the ISP 107. Typically, the ISP 107 has various computer-based resources to host what is now commonly called an "ecommerce web site" which appealing presents graphical representations of goods and services. The user views these graphical representations of goods and services via their Internet browser on their computer and can select and purchase the displayed goods and services from the ISP 107.

More particularly, FIG. 1 shows an ISP 107 including the visual browser 109 of the present invention. The visual browser of the present invention allows a user to navigate a virtual store (e.g. an ecommerce website) hosted by the ISP, without needing to express verbally what they are looking for (i.e. an explicit method), and instead provides non-explicit methods for virtual shopping. In particular, after a user picks a main product, the visual browser automatically presents similar and related products, and also possibly non-related products, to the user providing opportunities for the user to view and possibly purchase these other related and non-related products.

Figure 2:
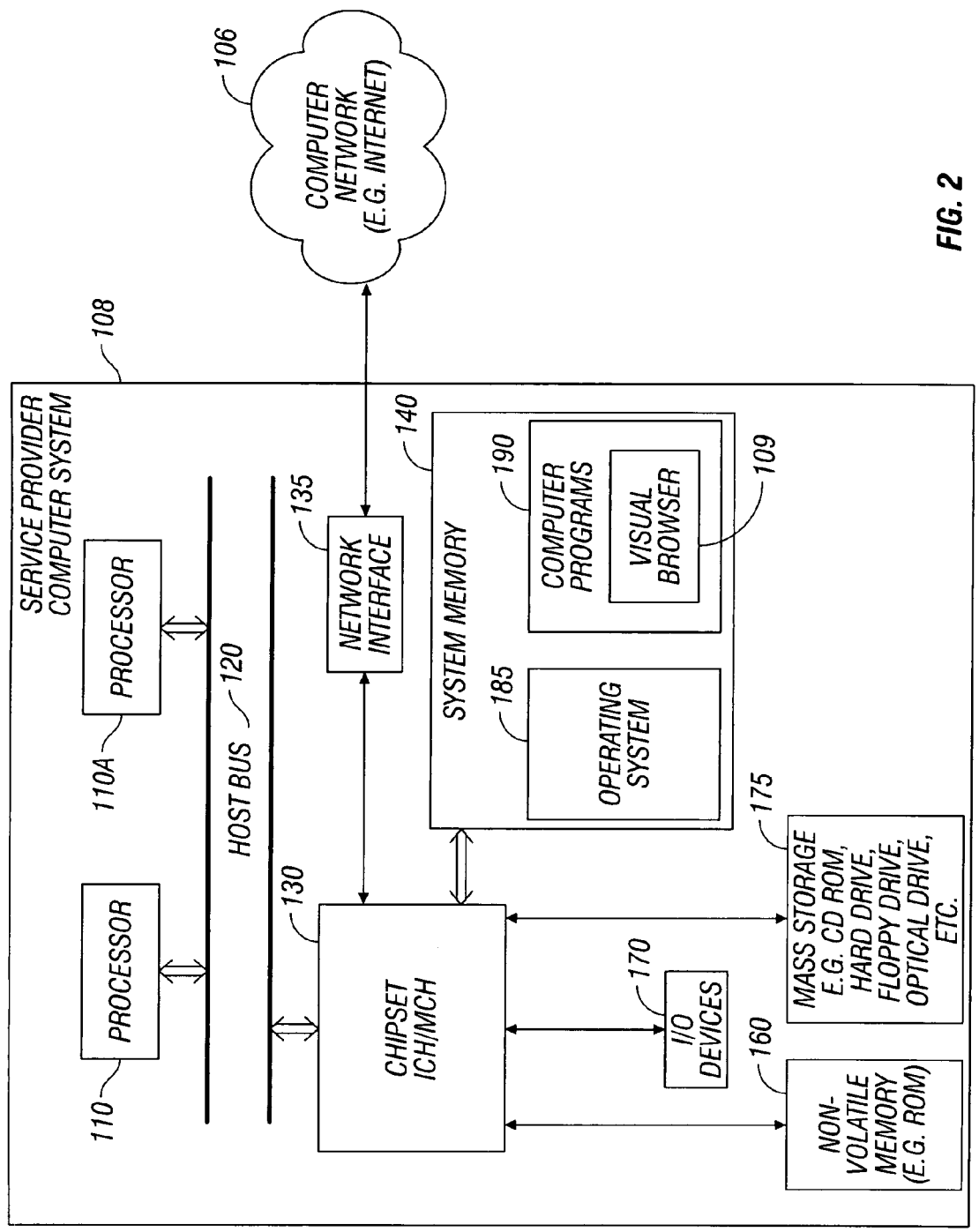
FIG. 2 is a diagram illustrating an exemplary computer system in which a visual browser according to one embodiment of the invention can be practiced.

FIG. 2 is a diagram illustrating an exemplary computer system 108 in which a visual browser 109 according to one embodiment of the invention can be practiced. A "computer system" is generally a product including circuitry capable of processing data. The service provider computer system 108 may include, but is not limited or restricted to, a conventional computer for an ISP (e.g. server computer, personal computer, workstation, minicomputer, mainframe, laptop, desktop, etc.). The computer system 108 may include at least one central processing unit (CPU) 110, a host bus 120, a chipset 130, a network interface 135, a system memory 140, a non-volatile memory (e.g. ROM) 160, and at least one input/output (I/O) device 170, and non-volatile mass storage 175.

The processor 110 may be coupled to the chipset 130. The term "coupled" encompasses a direct connection, an indirect connection, an indirect communication, etc. For example, the processor 110 may be coupled to chipset 130 via a host bus 120. The host bus 120 provides interface signals to allow the processor 110, or processors 110, 110a, and 110b, to communicate with other processors or devices, e.g., the chipset 130. Chipset 130 may also be coupled to system memory 140, a network interface 135, non-volatile memory (e.g. ROM) 160, I/O devices 170, and non-volatile mass storage 175. These devices may be coupled to chipset 130 over a bus or busses such as a system bus, peripheral component interface (PCI) bus, etc. Network interface 135 may contain logic to communicate using a standard network protocol. The computer network 106 may be a local or wide area computer network and may be, for example, an intranet or the Internet. Computer system 108 may also contain additional components such as a co-processor, modem, etc.

The processor 110 can be a central processing unit (CPU) of any type of architecture, such as complex instruction set computers (CISC), reduced instruction set computers (RISC), very long instruction word (VLIW), or hybrid architecture. For example, the CPU could be compatible with an Intel Architecture (IA) processor, such as the Pentium™ series, the IA-32™ and the IA-64™. In other embodiments, the processor can be an Application Specific Integrated Circuit (ASIC), controller, micro-controller, etc. In one embodiment, the computer 108 can be a single processor system, such as a desktop computer, which has only one main central processing unit, e.g. processor 110. In other embodiments, the computer 108 can include multiple processors, e.g. processors 110, 110a, 110b, etc. Thus, the computer 108 can be a multi-processor computer system having any number of processors. For example, the multi-processor host computer 108 can operate as part of a server or workstation environment.

Chipset 130 may be one or more integrated circuit chips that act as a hub or core for data transfer between the processor 110 and other components of the computer 108. For example, the chipset 130 can include a memory control hub (MCH) and an input/output controller hub (ICH). The MCH can integrate multiple functionalities such as memory control and host-to-peripheral bus interface. The MCH can provide control and configuration of memory and input/output devices such as the system memory 140 and the ICH. The ICH performs traditional I/O functions to control I/O device(s) 170. For clarity, not all the peripheral buses are shown. It is contemplated that the computer 108 may also include peripheral buses such as Peripheral Component Interconnect (PCI), accelerated graphics port (AGP), Industry Standard Architecture (ISA) bus, and Universal Serial Bus (USB), etc.

System memory 140 is a device that is adapted to store digital information. The system memory 140 can be used to store system code and data such as an operating system 185, computer programs 190, and the visual browser 109 of the present invention. The system memory 140 can be implemented with dynamic random access memory (DRAM) or static random access memory (SRAM), etc. or any combination thereof, or any other type of memory.

The I/O devices 170 may include any I/O devices to perform I/O functions. The I/O devices 170 can include a monitor, a keypad, a modem, a printer, or any other types of I/O devices, e.g., controllers for input devices (mouse, trackball, pointing device), media cards (e.g., audio, video, graphics), network cards, and any other peripheral controllers. The non-volatile mass storage 175 may be any device or devices adapted to store digital information, such as flash memory, a hard disk, a floppy drive, an optical digital storage device, a magneto-electrical storage device, DVD, CD-ROM, etc., or any combination thereof.

The exemplary computer 108 of FIG. 2 is only an example of a computer system that a visual browser 109 according to one embodiment of the invention can be practiced with. It should be appreciated the present invention can be practiced with any sort of computer or any sort of device that includes circuitry capable of processing data. In particular, in one embodiment of the present invention, the visual browser 109 can be generally implemented in a computer as one or more computer programs to perform the desired functions. The computer programs are comprised of instructions (e.g. code segments) which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. The computer programs may be loaded from memory, data storage devices, and/or remote devices into the memory of the computer for use during operations.

Those skilled in the art will recognize that the exemplary environment illustrated in FIGS. 1 in 2 is not intended to limit the present invention. Indeed, those skilled in the art will recognize that other alternative system environments may be used without departing from the scope of the present invention.

The visual browser of the present invention allows a user to navigate a virtual store hosted by an ISP, without needing to express verbally what they are looking for (i.e. an explicit method), and instead provides non-explicit methods for virtual shopping. In particular, after a user picks a main product, the visual browser automatically presents similar and related products, and also possibly non-related products, to the user providing opportunities for the user to view and possibly purchase these other related and non-related products. To accomplish this, the visual browser creates a plurality of categories in which each category identifies an attribute. Products having at least one attribute are associated with at least one category. Upon the selection of a main product by a user, the visual browser displays other related products having at least one attribute in common with the main product and possibly non-related products as well. In some embodiments, a weight bias factor is assigned to each category based upon a predefined importance of the respective category to the operator of the virtual store. For example, a category for best-selling products may be given a high weight bias factor.

Figure 3A:
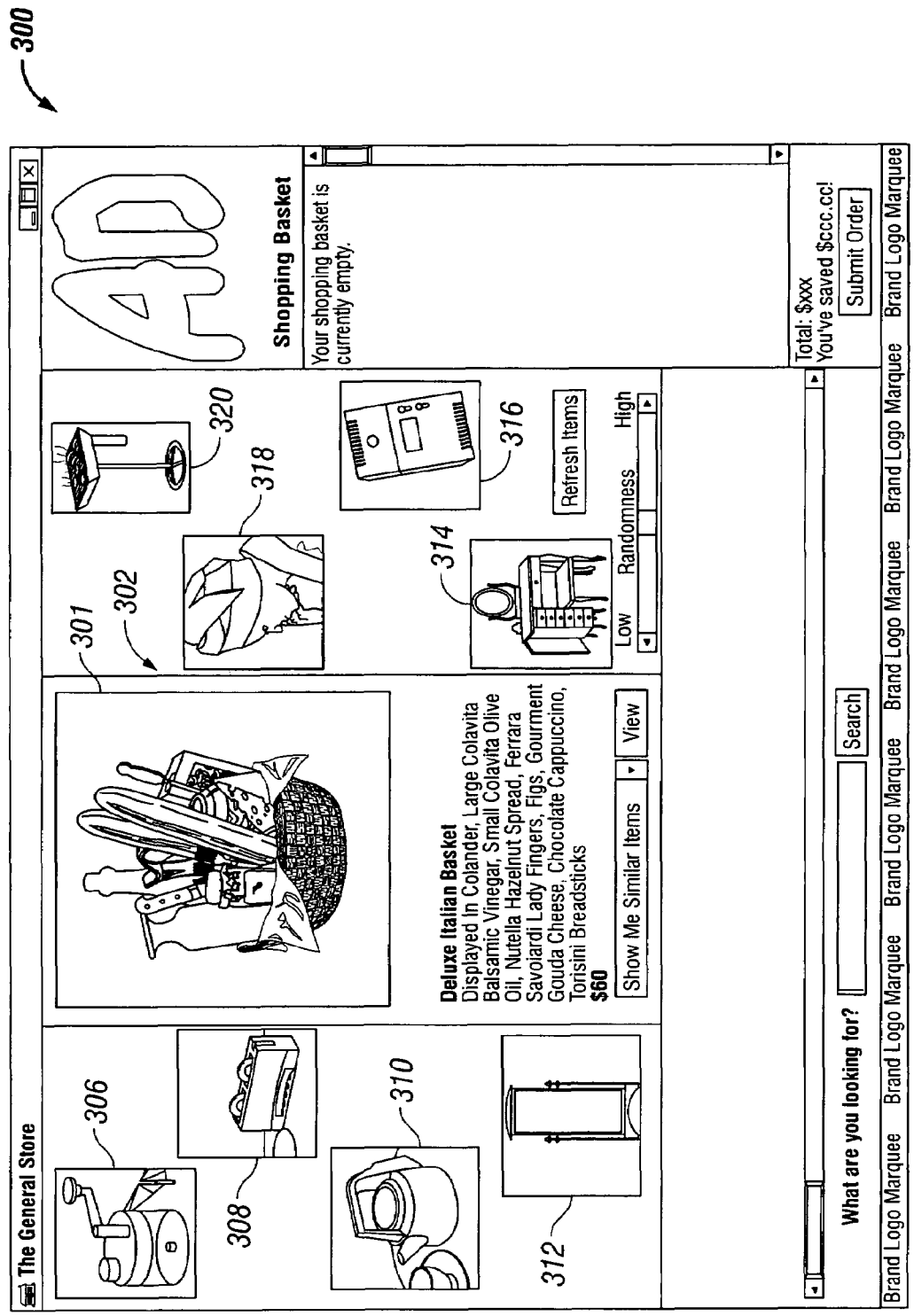
FIG. 3A is an example of a user interface at a user's terminal displaying a main product and related products according to one embodiment of the invention.

FIG. 3A is an example of a user interface 300 at a user's terminal computer displaying a main product and related products according to one embodiment of the invention. When a user logs on to a service provider having the visual browser of the present invention to engage in virtual shopping at the service provider's virtual store, the user is presented on the display of his/her computer with a user interface similar to that the FIG. 3A. Of course the types of products shown, depend upon the type of virtual store and the products carried by that virtual store. Utilizing the visual browser of the present invention, when a user first enters the virtual store a random selection of items from the service provider's database of products is displayed as in FIG. 3A. In this instance, a Deluxe Italian Basket 301 is randomly selected as the main product and is displayed in the main product space 302. Underneath the main product is a description of the main product and a price for the main product.

Also as shown in FIG. 3A, a number of related products having an attribute similar to that of the main product (Deluxe Italian Basket 300) are also randomly selected and shown in other product spaces to the left and right of the main product. For example, assuming that the Deluxe Italian Basket 301 has the attribute of a kitchen item (i.e. the Deluxe Italian Basket is in the category for kitchen items), the user interface of FIG. 3A presents randomly selected related products from the same kitchen item category, namely, a manual food processor 306, a toaster 308, and a kettle 310. Other less related products or randomly selected products are also displayed. The user interface 300 of FIG. 3A also displays a mirror 312, a vanity 314, a room thermometer 316, a hair towel 318, and a barbecue 320.

When a user selects any of the displayed products (e.g. by clicking on the product with the user's mouse), the display refreshes with an updated user interface. The visual browser causes the updated user interface to display the selected product as the main product and to display related products having at least one attribute in common with the main product, as well as, non-related products.

Figure 3B:
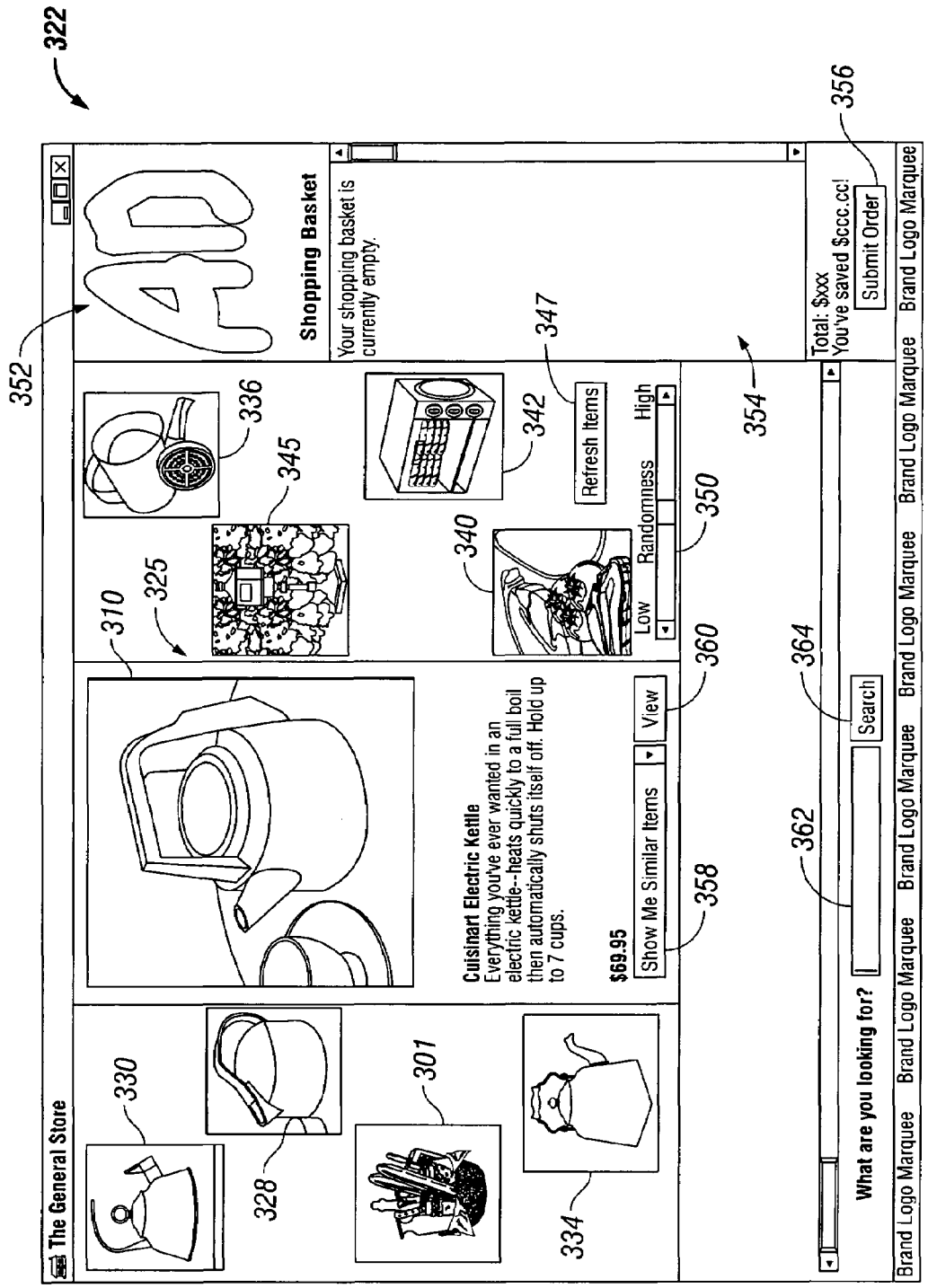
FIG. 3B is an example of a user interface at a user's terminal displaying a selected main product from FIG. 3A and related products according to one embodiment of the invention.

FIG. 3B is an example of a user interface 322 at a user's terminal displaying a selected main product from FIG. 3A and related products according to one embodiment of the invention. In response to the user selecting the kettle 310 from FIG. 3A, FIG. 3B shows the kettle 310 display in the main product space 325, and a plurality of related products, as well as, a non-related product. For example, assuming that the kettle has the attributes of a kettle/pot and a kitchen item, FIG. 3B presents randomly selected related products from the same kettle/pot item category, namely, another kettle 330, an electric kettle 332, a teapot 334, and coffee pot 336. Other less related products or randomly selected products are also displayed. For example, the less related general kitchen items of the Deluxe Italian Basket 301, steaks 340, and a toaster over 342 are also displayed. Further, a non-related item is selected such as the mailbox 345.

The user interface 322 also displays other features. For example, the user interface 322 includes a Refresh Items button 347 that causes the visual browser 109 to display other related and non-related items. The user interface 332 also includes a randomness scroll bar control 350 which allows a user to specify how related our random they want subsequent displayed products to be. Further, the user interface 322 includes an Advertisement window 352 for the display of advertisements and a Shopping Basket window 354 to show selected products and the total cost of the products, as well as, a Submit Order button 356 to allow the user to order the products selected. Also, the user interface 322 includes a combo box 358 having as one selectable item a "show me similar items" feature and an adjacent view button 360. Selection of the "show me similar items" feature from the combo box 358 and depression of the view button 360 causes the visual browser to display similar and related items. Additionally, the user interface 322 includes a text box 362 and an adjacent search button 364 such that a user can manually enter in products (via text) that they are looking for into the text box 362 and depress the search button 364 such that the visual browser will display the desired product along with related and possibly non-related products. The visual browser by automatically exposing users to other products that are similar or related to the main product originally selected by the user, as well as non-related products, increases the user's exposure to available products and provides opportunities for serendipitous impulse purchases.

Figure 4A:
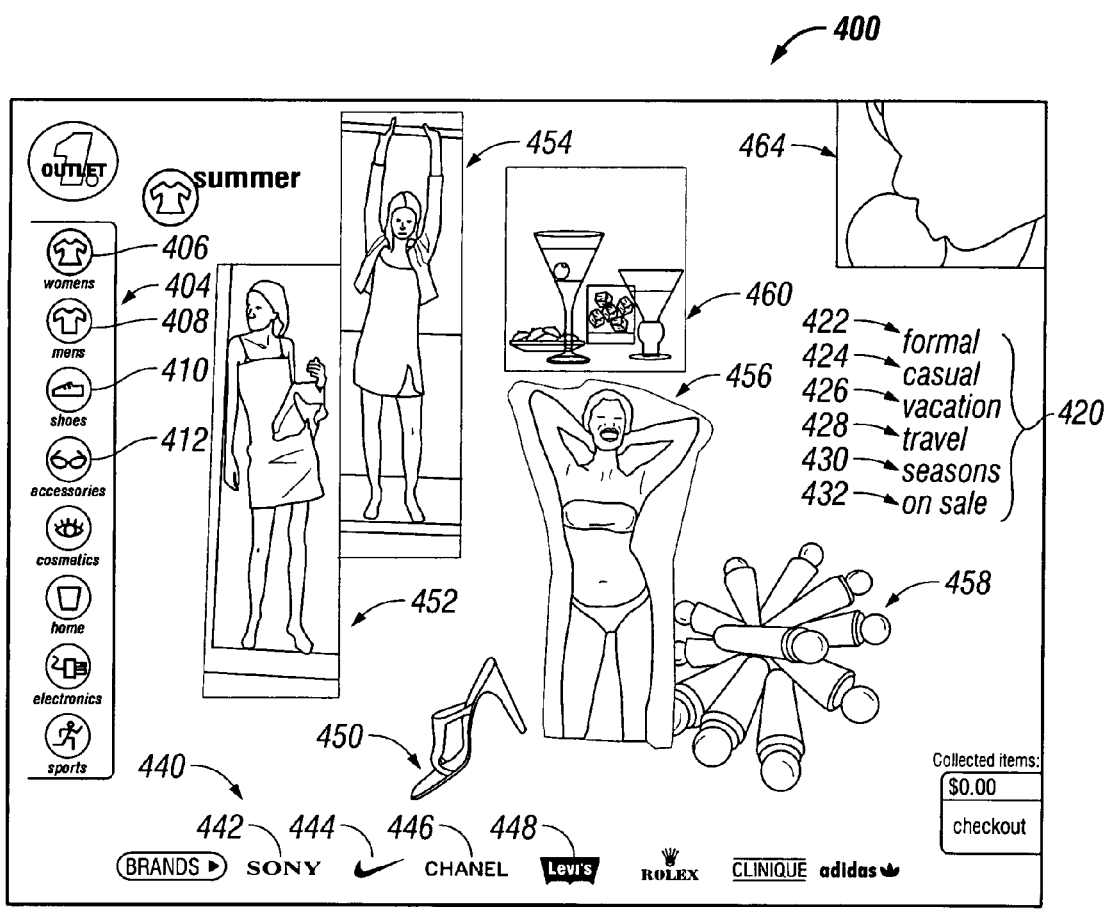
FIG. 4A is an example of a user interface at a user's terminal displaying related products according to one embodiment of the invention.

FIG. 4A is an example of a user interface at a user's terminal displaying related products according to one embodiment of the invention. In this embodiment, the visual browser in conjunction with the user interface 400 utilizes filters by category, brand, or context to select and display products and editorial items. In particular, user interface 400 displays a category filter window 404 having a plurality of different selectable category buttons. For example, the category filter window 404 includes category buttons such as a woman's apparel category button 406, a men's apparel category button 408, a shoes category button 410, and an accessories category button 412, along with others as shown in FIG. 4A. User interface 400 also displays a context filter window 420 having a plurality of different selectable context buttons. For example, the context filter window 420 includes context buttons such as a formal context button 422, a casual context button 424, a vacation context button 426, a travel context button 428, a seasons context button 430 and an on sale context button 432. User interface 400 additionally displays a brands window 440 having a plurality of different selectable brand buttons. For example, the brands window 440 includes brand buttons such as a Sony brand button 442, a Nike brand button 444, a Chanel brand button 446, a Levis brand button 448, along with others as shown in FIG. 4A.

Utilizing the user interface 400 allows users to apply filters by category, brand, and context such that the visual browser selects and displays items on the user interface 400 that are generally related to the user's filter choices. Thus, the user is exposed to a variety of related products, based upon their general filter choices, and their shopping experience is directed by the visual browser in an indirect way. This is analogous to navigating the aisles of a department store in which the shopper is exposed to a wide variety of related products depending upon which aisle the shopper is in.

For example, in the user interface 400 of FIG. 4A, the user has selected the category woman's apparel and the season context of summer. In response, the visual browser displays related products having similar or related attributes to those chosen by the user. For example, the user interface 400 displays a shoe 450 related to the women's apparel attribute. Also, the user interface 400 displays a first summer dress 452, a second summer dress 454, and a bikini 456 (all being modeled by women) all of which are related to both the women's apparel attribute and the summer attribute. Further, the visual browser selects less related or randomly related products for display as well. Thus, the user interface 400 also displays lipstick 458 and champagne glasses 460. Also, the user interface 400 can also include supporting information such as videos 464 (e.g. a woman blowing a bubble), shown in the right hand corner, articles, and 3-D scenes and models (e.g. the female models modeling women's apparel—the bikini and summer dresses) are integrated into the browsing field of the user interface 400 making the virtual shopping experience more enjoyable.

When a user selects any of the displayed products (e.g. by clicking on the product with the user's mouse), the display refreshes with an updated user interface. The visual browser causes the updated user interface to display the selected product as the main product and to display related products having at least one attribute in common with the main product and possibly non-related products.

Figure 4B:
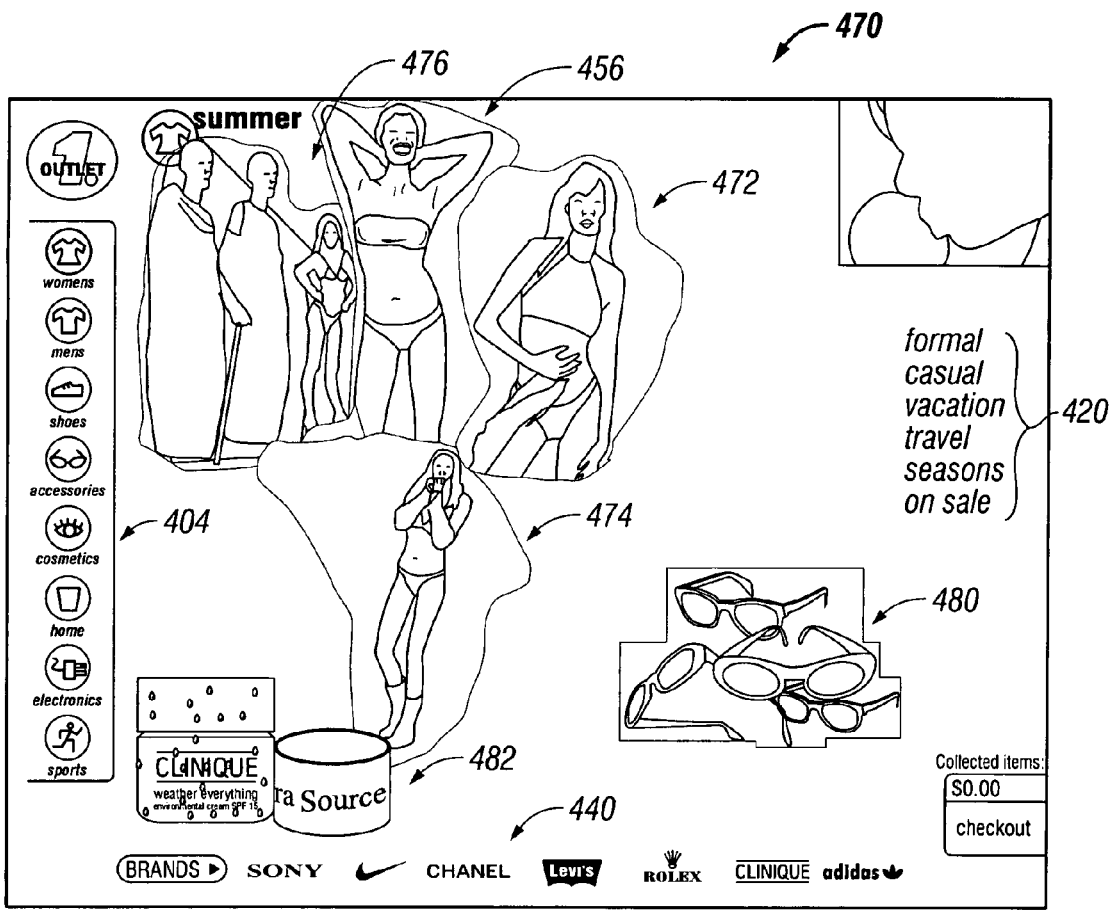
FIG. 4B is an example of a user interface at a user's terminal displaying a selected main product from FIG. 4A and related products according to one embodiment of the invention.

FIG. 4B is an example of a user interface 470 at a user's terminal displaying a selected main product from FIG. 4A and related products according to one embodiment of the invention. In response to the user selecting the bikini 456 as the main product from FIG. 4A, FIG. 4B shows the bikini 456 and a plurality of other related products. For example, assuming the selected main product, the bikini 456, has the attribute of beach, the visual browser selects other related products related to women's apparel, summer, and the beach. Thus, the user interface 470 displays a first bikini 472, a second bikini 474, and a third bikini 476 (all being modeled by swim suit models) around the selected main bikini 456. Further, the visual browser selects other related products to be displayed as well such as sunglasses 480 and sunscreen 482. The user interface 470 also includes a Collected items window 486 to show the total cost of the products, as well as, a checkout button 488 to allow the user to order to products selected.

The visual browser in conjunction with the user interfaces provide an exciting and unique virtual online shopping experience in that the user never explicitly states that they are looking for beach related items. Instead, the user has expressed a general interest in women's apparel via a filter, has further applied the context filter of summer, and has indicated by clicking on the bikini that they would like to see more products along this line. Accordingly, the visual browser selects other related items (having similar attributes to bikini (e.g. the attribute of beach)) and the visual browser through the user interface displays these other related items such as other bikinis, sunglasses, and sunscreen. Advantageously, the visual browser by automatically exposing users to other products that are similar or related to the bikini selected by the user increases the opportunity for serendipitous impulse purchases. Further, shopping for products on-line with a virtual store utilizing the visual browser of the present invention is fun and exciting and provides a viable alternative to shopping in a physical mall. Also the visual browser allows for a wider selection of products to be advertised in a virtual store, as compared to current virtual stores, which generally only advertise niche categories (e.g. books, CDs, and software). Thus, the visual browser of the present invention may help propel ecommerce beyond the simple virtual stores of today that sell items from niche categories (books, CDs, and software) through standard explicit methods (e.g. searching on terms for desired products and drilling down through a myriad of categories) into an entertaining activity of virtual shopping for a wide variety of products, comparable to real-world shopping at mall, but without the parking hassles and checkout lines.

Another advantage of the visual browser of the present invention is that new products can be easily added to the virtual store (e.g. ecommerce web site) and the visual browser automatically accommodates the new products and their profiles (e.g. categories and attributes) such that the visual browser displays them appropriately with already existing products. Thus, as the virtual store's product mix changes, the visual browser's display results automatically change as well, to appropriately reflect the new product mix. This is in contrast to current online stores which often manually hard-code products to appear on the same page.

Various methods, processes, procedures and/or algorithms will now be discussed to implement certain aspects of the visual browser of the present invention.

Figure 5:
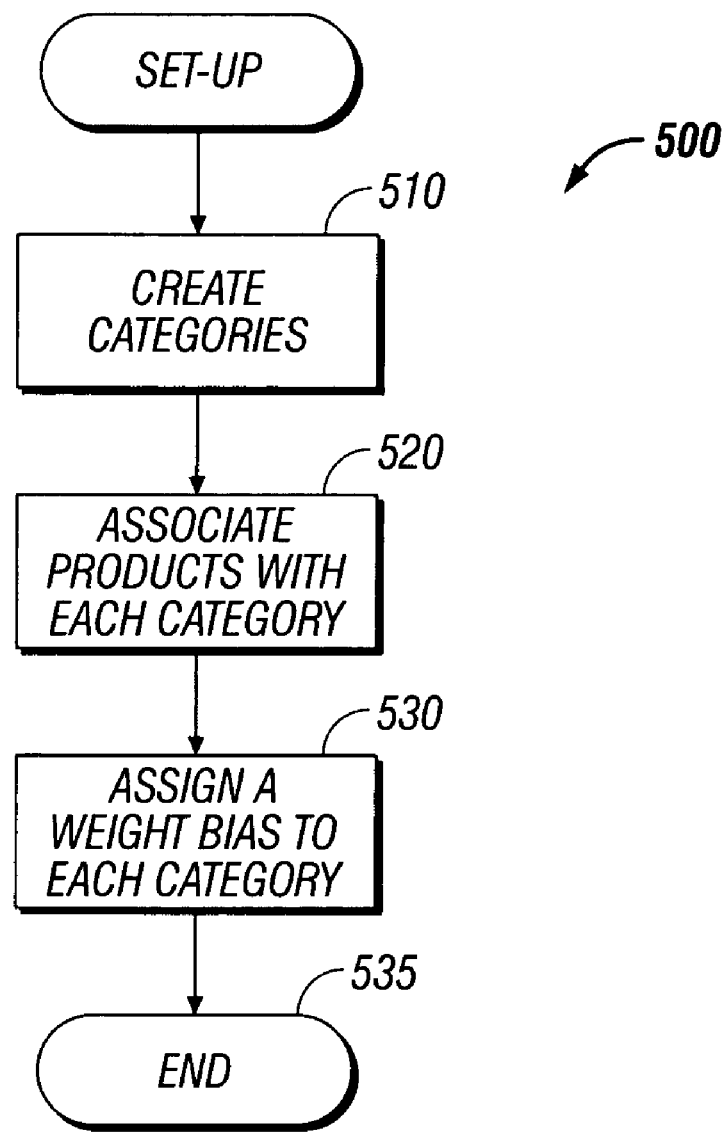
FIG. 5 is a flowchart illustrating a process for the visual browser to set-up categories and associate products according to one embodiment of the invention.

FIG. 5 is a flowchart illustrating a process 500 for the visual browser to set-up categories and associate products according to one embodiment of the invention. The process 500 first creates a plurality of categories, in which, each category identifies an attribute or certain trait that will be used to identify a product (block 510). Thus, a category is basically used to identify products with similar attributes. Examples of some useful categories could be: products used at home, products used in the kitchen, certain types of kitchen products such as a kettle/pot, products used outside the home, or best selling products. For example, these types of categories would be useful for a virtual ecommerce store that sells home based products. Next, products having at least one attribute are associated with the categories that identify the attribute of the product (block 520). Thus, each category is filled up with products having the requisite attribute. Of course, a product can be simultaneously assigned to different categories. For example, the kettle 310 discussed with reference to FIGS. 3A and B was associated with the categories kitchen and kettle/pot. Further, a weight bias can be assigned to each category (block 530). The weight bias for a category determines a categories level of importance. A category with a higher importance is more likely to have its products displayed more often. For example, the category for best selling products will probably get a higher weight bias than the category for products used outside the home by a virtual ecommerce store using the visual browser of the invention. The process 500 is then terminated (block 535).

Figure 6A:
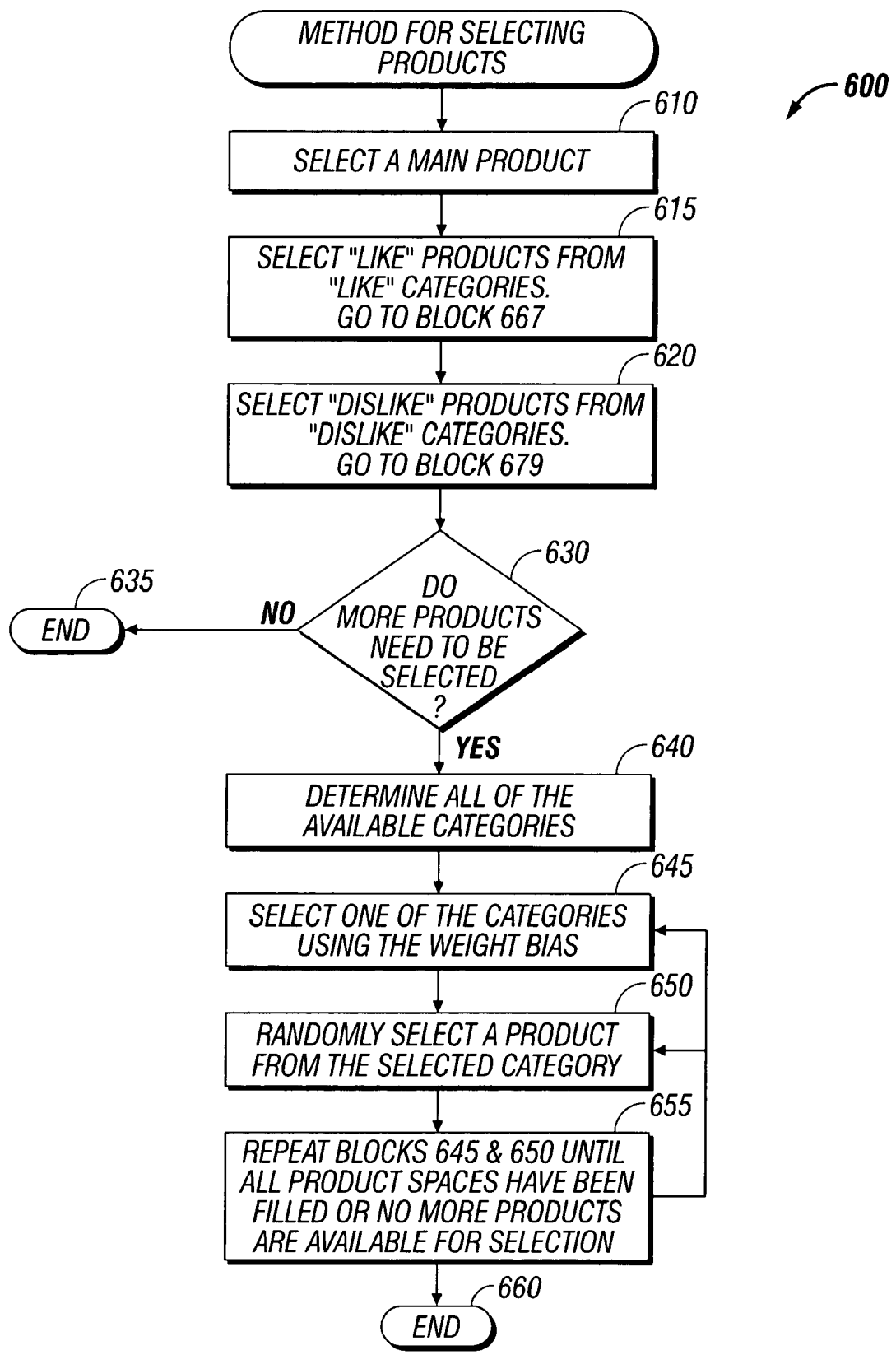
FIG. 6A is a flowchart illustrating a process for the visual browser to select related and non-related products according to one embodiment of the invention.

FIG. 6A is a flowchart illustrating a process 600 for the visual browser to select related and non-related products according to one embodiment of the invention. The process 600 uses the concept of "like" categories and "dislike" categories. Initially, a main product is selected. (block 610). The main product is either explicitly picked by the user or randomly selected from a subset of products. For example, with reference to the previous example shown in FIGS. 3A and B, a user selects the kettle 310 product in FIG. 3A which then becomes the main product in FIG. 3B. A product is said to be in a "like" category if it is in the same category as the main product. Likewise, a product is said to be in a "dislike" category if it is not in the same category as the main product. Next, the process 600 selects "like" products from "like" categories and goes to block 665 of the sub-process 617 illustrated in FIG. 6B (block 615).

Figure 6B:
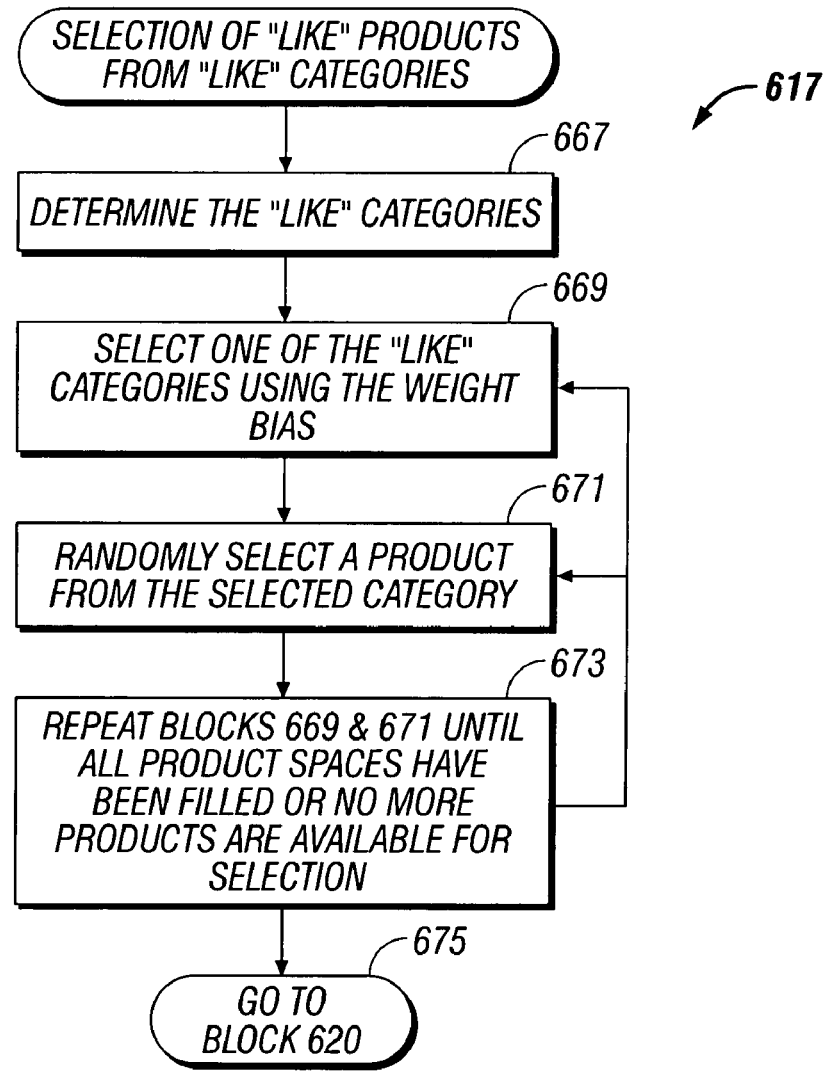
FIG. 6B is a flowchart illustrating a sub-process of FIG. 6A for the visual browser to select "like" products from "like" categories according to one embodiment of the invention.

FIG. 6B is a flowchart illustrating a sub-process 617 of FIG. 6A for the visual browser to select "like" products from "like" categories according to one embodiment of the invention. First, the sub-process 617 determines the "like" categories for the main product (block 667). The "like" categories are the categories that the main product is associated with. Next, one of the "like" categories is selected (block 669).

In one embodiment, the "like" category is selected utilizing the weight biases for the categories in a randomly based selection algorithm. To accomplish this, all of the weight biases for all of the "like" the categories that the main product is associated with are summed together. Then a random number is selected from zero to the sum of the weight biases of the categories and is subtracted by one. Next, the categories are looped through and for each category the weight bias of that category is subtracted from the random number. When the random number becomes negative on a category, then that is the category from which a "like" product will be randomly selected.

After the selection of a "like" category (block 669), a product is randomly selected from the selected category (block 671). Blocks 669 and 671, selecting "like" categories and randomly selecting "like" products therefrom, are repeated until all of the product spaces on the user interface have been filled or there are no more products that are available for selection (block 673). For example, continuing with the example of FIG. 3B, the sub-process 617 may loop through and select the "like" categories of kitchen and kettle/pot and from those categories randomly select "like" products. For instance, the related "like" products of another kettle 330, an electric kettle 332, a teapot 334, and coffee pot 336 could be randomly selected from the kettle/pot category and displayed via the user interface and from the other "like" category for kitchen items the Deluxe Italian Basket 301, steaks 340, and a toaster over 342 can be randomly selected and displayed via the user interface. Also, a product is never shown twice on the same user interface page so a check is performed to make sure that a product is not duplicated. Next, the sub-process 617 returns to block 620 of the main process 600 shown in FIG. 6A (block 675).

Figure 6C:
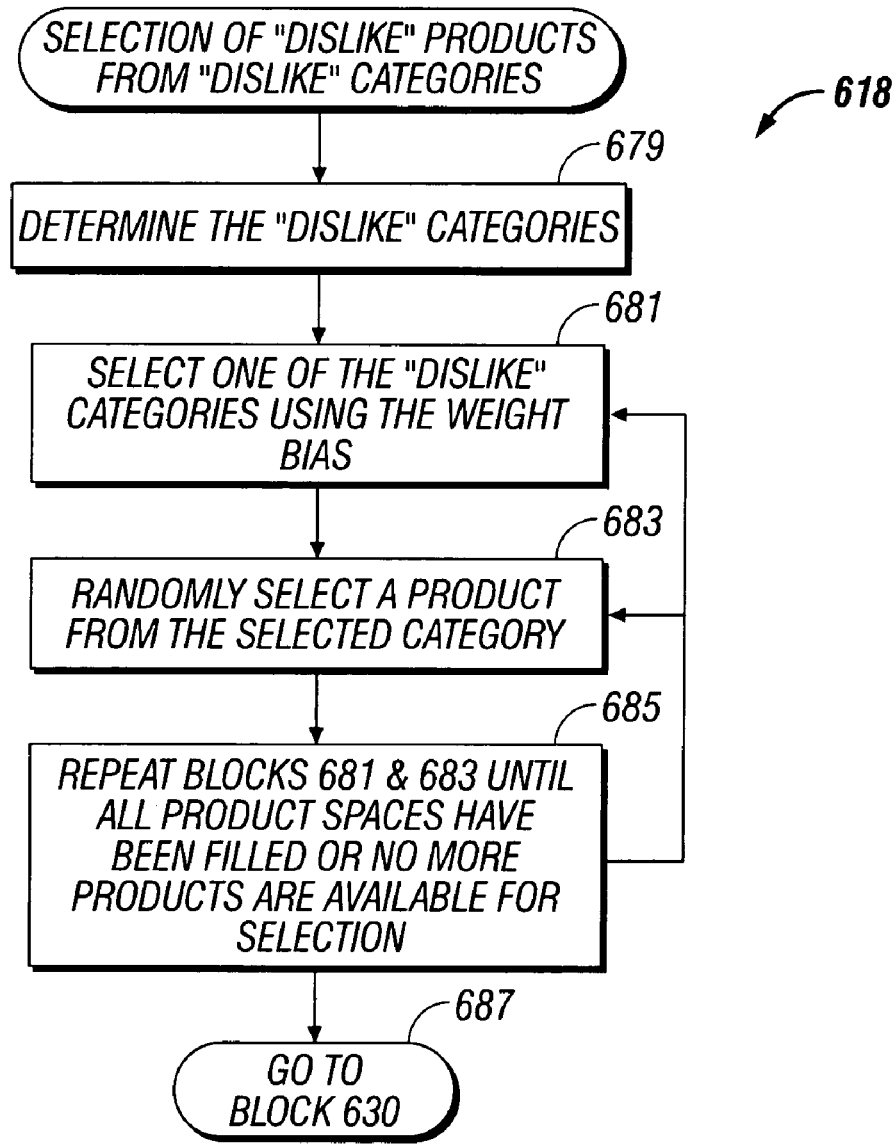
FIG. 6C is a flowchart illustrating a sub-process of FIG. 6A for the visual browser to select "dislike" products from "dislike" categories according to one embodiment of the invention.

The process 600 next selects "dislike" products from "dislike" categories and goes to block 679 of the sub-process 618 illustrated in FIG. 6C (block 620). FIG. 6C is a flowchart illustrating the sub-process 618 of FIG. 6A for the visual browser to select "dislike" products from "dislike" categories according to one embodiment of the invention. First, the sub-process 618 determines the "dislike" categories for the main product (block 679). The "dislike" categories are the categories that the main product is not associated with. Next, one of the "dislike" categories is selected (block 681).

In one embodiment, the "dislike" category is selected utilizing the weight biases for the categories in the randomly based selection algorithm previously discussed. Thus, the randomly based selection algorithm is the same one previously described with reference to the "like" categories except that it now operates on the "dislike" categories to select a "dislike" category from which to randomly select a "dislike" product.

After the selection of a "dislike" category (block 681), a "dislike" product is randomly selected from the selected "dislike" category (block 683). Blocks 681 and 683, selecting "dislike" categories and randomly selecting "dislike" products therefrom, are repeated until all of the product spaces on the user interface have been filled or there are no more products that are available for selection (block 685). For example, continuing with the example of FIG. 3B, the process 618 may loop through and select the "dislike" category of outdoor products and from that category the mailbox 345 may be randomly selected and displayed via the user interface. Also, a product is never shown twice on the same user interface page so a check is performed to make sure that a product is not duplicated. Next, the sub-process 618 returns to block 630 of the main process 600 shown in FIG. 6A (block 687).

The process 600 next determines whether or not more products need to be selected (block 630). If no more products need to be selected (i.e. all the product spaces are filled) then the process 600 terminates (block 635). However, it may be impossible to fill all of the product spaces with "like" or "dislike" products. This could be due to there not being enough products in the "like" or "dislike" categories. Thus, if more products need to be selected (i.e. all the product spaces are not filled), then the process continues to block 640. The process 600 then determines all of the available categories (block 640). Next, one of the categories is selected (block 645).

In one embodiment, one of the categories is selected utilizing the weight biases for the categories in the randomly based selection algorithm previously discussed. Thus, the randomly based selection algorithm is the same one previously described with reference to the "like" and "dislike" categories except that it operates on all the categories to select one category from which to randomly select a product.

After the selection of a category (block 645), a product is randomly selected from the selected category (block 650). Blocks 645 and 650, selecting categories and randomly selecting products therefrom, are repeated until all of the product spaces on the user interface have been filled or there are no more products that are available for selection. Also, as before, a product is never shown twice on the same user interface page, so a check is performed to make sure that a product is not duplicated. The process 600 is then terminated (block 660).

Figure 7A:
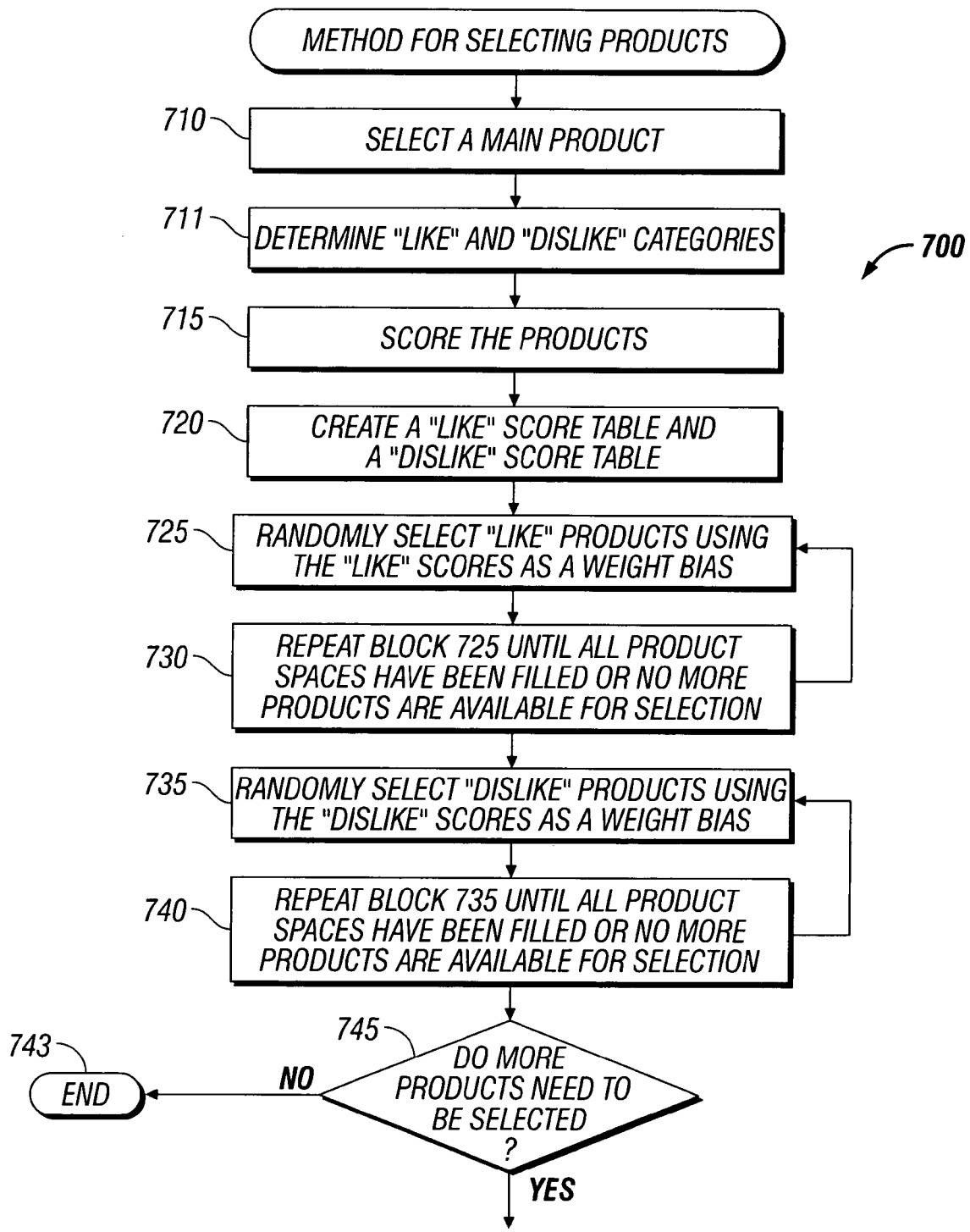
FIG. 7 is a flowchart illustrating another process for the visual browser to select related and non-related products according to one embodiment of the invention.
Figure 7B:
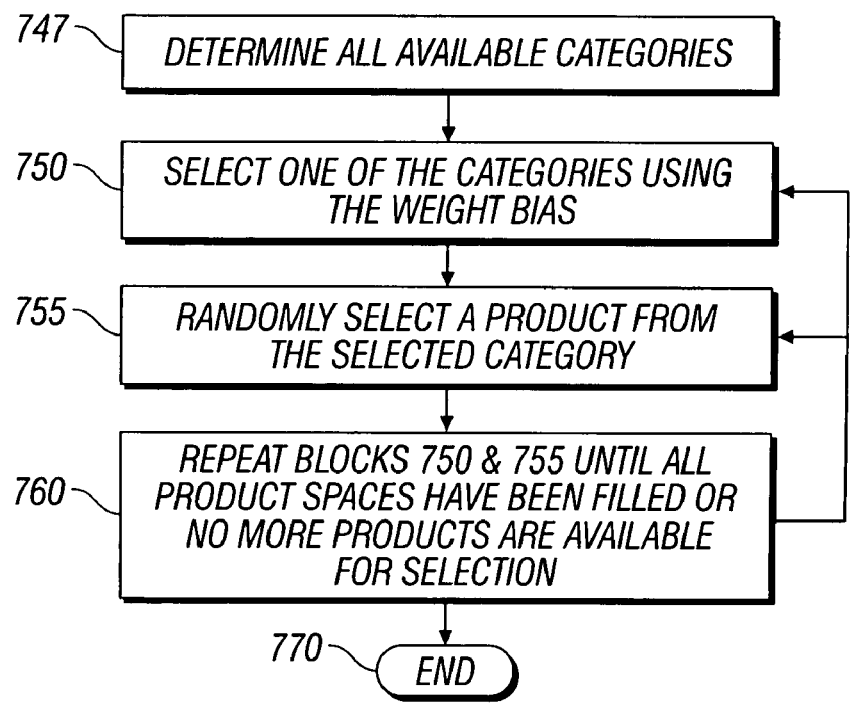

FIG. 7 is a flowchart illustrating another process 700 for the visual browser to select related and non-related products according to one embodiment of the invention. The process 700 basically scores each product based on how many "like" categories it belongs to and on how many "dislike" categories it belongs to. Initially, a main product is selected (block 710). The main product is either explicitly picked by the user or randomly selected from a subset of products. For example, with reference to the previous example shown in FIGS. 3A and B, a user selects the kettle 310 product in FIG. 3A which then becomes the main product in FIG. 3B. Next, the process 700 determines the "like" and the "dislike" categories for the main product (block 711). The "like" categories are the categories that the main product is associated with whereas the "dislike" categories are the categories that the main product is not associated with.

The process 700 then scores each of the available products (block 715). Scoring is based upon the weight biases of the "like" categories and the "dislike" categories. As discussed previously a weight bias is a predefined value assigned to each respective category to denote the respective category's importance. A product's score starts at zero and is added to by the amount of the "like" weight bias of each "like" category that the product belongs to. However, the product score is subtracted by the amount of the "dislike" weight bias of the "like" category if the product does not belong to that "like" category. Further, the product score is also subtracted by the amount of the "dislike" weight bias for each "dislike" category that the product belongs to. This creates a "like" score for a product.

The process 700 then creates a "like" score table and a "dislike" score table (720). The "like" score table is created from each "like" score for each product. The "dislike" score table is simply the transposition of the "like" score table. Next, the process 700 randomly selects "like" products from the "like" score table using the "like" scores as a weight bias (block 725). Block 725, which randomly selects "like" products from the "like" score table, is repeated until all of the product spaces on the user interface have been filled or there are no more products that are available for selection (block 730). For example, continuing with the example of FIG. 3B, the process 700 may randomly select the following related "like" products to the main kettle product 310 from the "like" score table: the other kettle 330, an electric kettle 332, a teapot 334, a coffee pot 336, a Deluxe Italian Basket 301, steaks 340, and a toaster over 342 which are displayed via the user interface. Also, it should be noted that a product is never shown twice on the same user interface page so a check is performed to make sure that a product is not duplicated The process 700 then randomly selects "dislike" products from the "dislike" score table using the "dislike" scores as a weight bias (block 735). Block 735, which randomly selects "dislike" products from the "dislike" score table, is repeated until all of the product spaces on the user interface have been filled or there are no more products that are available for selection (block 740). For example, continuing with the example of FIG. 3B, the process 700 may randomly select the "dislike" product of the mailbox 345 from the "dislike" score table which is displayed via the user interface. Also, it should be noted that a product is never shown twice on the same user interface page so a check is performed to make sure that a product is not duplicated.

The process 700 next determines whether or not more products need to be selected (block 745). If no more products need to be selected (i.e. all the product spaces are filled) then the process 700 terminates (block 743). However, it may be impossible to fill all of the product spaces with "like" or "dislike" products. Thus, if more products need to be selected (i.e. all the product spaces are not filled), then the process continues to block 747. The process 700 then determines all of the available categories (block 747). Next, one of the categories is selected using the weight biases of the categories (block 750). After the selection of a category (block 750), a product is randomly selected from the selected category (block 755). Blocks 750 and 755, selecting categories and randomly selecting products therefrom, are repeated until all of the product spaces on the user interface have been filled or there are no more products that are available for selection. Also, a product is never shown twice on the same user interface page so a check is performed to make sure that a product is not duplicated. The process 700 is then terminated (block 770).

As previously described, the visual browser of the present invention allows a user to navigate a virtual store hosted by an ISP, without needing to express verbally what they are looking for (i.e. an explicit method), and instead provides non-explicit methods for virtual shopping. In particular, after a user picks a main product, the visual browser automatically presents similar and related products, and also possibly non-related products, to the user providing opportunities for the user to view and possibly purchase these other related and non-related products. Advantageously, the visual browser increases the chance of serendipitous impulse purchases. Further, shopping for products on-line with a virtual store utilizing the visual browser of the present invention is fun and exciting. It provides a viable alternative to shopping in a physical mall and also allows for a wider selection of products to be advertised in a virtual store, as compared to current virtual stores, which generally only advertise niche categories (e.g. books, CDs, and software). Thus, the visual browser of the present invention may help propel ecommerce beyond the simple virtual stores of today that sell items from niche categories (books, CDs, and software) through standard explicit methods (e.g. searching on terms for desired products and drilling down through a myriad of categories) into an entertaining activity of virtual shopping for a wide variety of products, comparable to real-world shopping at mall, but without the parking hassles and checkout lines.

Another advantage of the visual browser of the present invention is that new products can be easily added to the virtual store (e.g. ecommerce web site) and the visual browser automatically accommodates the new products and their profiles (e.g. categories and attributes) such that the visual browser displays them appropriately with already existing products. Thus, as the virtual store's product mix changes, the visual browser's display results automatically change as well, to appropriately reflect the new product mix. This is in contrast to current online stores which often manually hard-code products to appear on the same page.

While the present invention and its various functional components been described in particular embodiments, it should be appreciated the present invention can be implemented in hardware, software, firmware, middleware or a combination thereof and utilized in systems, subsystems, components, or sub-components thereof. When implemented in software, the elements of the present invention are the code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a processor, a computer, etc.). Examples of the machine/processor-readable medium include an electronic circuit, a semiconductor memory device, a ROM, a flash memory, an erasable programmable ROM (EPROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

In particular, in one embodiment of the present invention, the visual browser can be generally implemented in a computer as one or more computer programs, to perform the desired operations, functions, and processes as previously described.

The computer programs are comprised of instructions (e.g. code segments) which when read and executed by the computer, cause the computer to perform the operations necessary to implement and/or use the present invention. Generally, the computer programs are tangibly embodied in and/or readable from a device, carrier, or media, such as memory, data storage devices, and/or a remote device coupled to the computer via data communication devices. Under control of the operating system, the computer programs may be loaded from memory, data storage devices, and/or remote devices into the memory of the computer for use during operations.

Thus, the visual browser according to one embodiment of the present invention may be implemented as a method, apparatus, or machine-readable medium (e.g. a processor readable medium or a computer readable medium) using standard programming and/or engineering techniques to produce software, firmware, hardware, middleware, or any combination thereof. The term "machine readable medium" (or alternatively, "processor readable medium" or "computer readable medium") as used herein is intended to encompass a medium accessible from any machine/process/computer for reading and execution. Of course, those skilled in the art will recognize that many modifications may be made to this configuration without departing from the scope of the present invention.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   upon a user accessing a virtual store having a visual browser via a computer network, displaying a random assortment of graphical representations of products to the user associated with the virtual store;
   creating a plurality of categories, each category including an attribute;
   associating products having at least one attribute with at least one category;
   allowing the user in communication with the visual browser to select a graphical representation of a main product;
   upon selection of the main product, automatically displaying graphical representations of a plurality of related products having at least one attribute in common with the main product that are selectable for purchase by the user and at least one graphical representation of another product that is not associated with the main product, the plurality of products being determined by:
      assigning a weight bias to each category based upon a predefined importance of the respective category;
      determining "like" and "dislike" categories for the main product, a "like" category being a category that the main product is associated with and a "dislike" category being a category that the main product is not associated with;
      selecting "like" and "dislike" categories utilizing weight biases for the categories in a randomly based selection algorithm; and
      randomly selecting products from the selected "like" and "dislike" categories based upon a scoring of each product that is utilized as the weight bias, wherein the scoring of each product is based upon either a like score indicating the relatedness of the product to the main product or a dislike score indicating the unrelatedness of the product to the main product.

2. The method of claim 1, further comprising:
   creating a "like" score table, the "like" score table including the "like" score for each of the products indicating the relatedness of the product to the main product; and
   randomly selecting at least one other related product from the "like" score table using the "like" scores as the weight bias.

3. The method of claim 2, further comprising:
   creating a "dislike" score table, the "dislike" score table including the "dislike" score for each product indicating the unrelatedness of the product to the main product, the "dislike" score table being the transposition of the "like score table"; and
   randomly selecting at least one other product from the "dislike" score table using the "dislike" scores as the weight bias.

4. The method of claim 3, further comprising, selecting at least one other product at random from one of the plurality of categories.

5. A machine-readable medium of a storage device having tangibly stored thereon instructions, which when executed by a machine, causes the machine to perform operations comprising:

upon a user accessing a virtual store having a visual browser via a computer network, displaying a random assortment of graphical representations of products to the user associated with the virtual store;

creating a plurality of categories, each category including an attribute;

associating products having at least one attribute with at least one category;

allowing the user in communication with the visual browser to select a graphical representation of a main product;

upon selection of the main product, automatically displaying graphical representations of a plurality of related products having at least one attribute in common with the main product that are selectable for purchase by the user and at least one graphical representation of another product that is not associated with the main product, the plurality of products being determined by:

assigning a weight bias to each category based upon a predefined importance of the respective category;

determining "like" and "dislike" categories for the main product, a "like" category being a category that the main product is associated with and a "dislike" category being a category that the main product is not associated with;

selecting "like" and "dislike" categories utilizing weight biases for the categories in a randomly based selection algorithm; and randomly selecting products from the selected "like" and "dislike" categories based upon a scoring of each product that is utilized as the weight bias, wherein the scoring of each product is based upon either a like score indicating the relatedness of the product to the main product or a dislike score indicating the unrelatedness of the product to the main product.

6. The machine-readable medium of claim 5, further comprising the operations of:

creating a "like" score table, the "like" score table including the "like" score for each of the products indicating the relatedness of the product to the main product; and randomly selecting at least one other related product from the "like" score table using the "like" scores as the weight bias.

7. The machine-readable medium of claim 6, further comprising the operations of:

creating a "dislike" score table, the "dislike" score table including the "dislike" score for each product indicating the unrelatedness of the product to the main product, the "dislike" score table being the transposition of the "like score table"; and randomly selecting at least one other product from the "dislike" score table using the "dislike" scores as a weight bias.

8. The machine-readable medium of claim 7, further comprising the operation of selecting at least one other product at random from one of the plurality of categories.

9. An apparatus comprising:

a processor and a memory coupled thereto, the memory storing a visual browser;

a network interface to couple to a computer network;

upon a user accessing a virtual store having the visual browser via the computer network, the visual browser, displaying a random assortment of graphical representations of products to the user associated with the virtual store;

creating a plurality of categories, each category including an attribute;

associating products having at least one attribute with at least one category;

allowing the user in communication with the visual browser via the computer network to select a graphical representation of a main product;

upon selection of the main product, automatically displaying graphical representations of a plurality of related products having at least one attribute in common with the main product that are selectable for purchase by the user and at least one graphical representation of another product that is not associated with the main product, the plurality of products being determined by:

assigning a weight bias to each category based upon a predefined importance of the respective category;

determining "like" and "dislike" categories for the main product, a "like" category being a category that the main product is associated with and a "dislike" category being a category that the main product is not associated with;

selecting "like" and "dislike" categories utilizing weight biases for the categories in a randomly based selection algorithm; and randomly selecting products from the selected "like" and "dislike" categories based upon a scoring of each product that is utilized as the weight bias, wherein the scoring of each product is based upon either a like score indicating the relatedness of the product to the main product or a dislike score indicating the unrelatedness of the product to the main product.

10. The apparatus of claim 9, wherein the visual browser:

creates a "like" score table, the "like" score table including the "like" score for each of the products indicating the relatedness of the product to the main product; and randomly selects at least one other related product from the "like" score table using the "like" scores as a weight bias for display to the user.

11. The apparatus of claim 10, wherein the visual browser:

creates a "dislike" score table, the "dislike" score table including the "dislike" score for each product indicating the unrelatedness of the product to the main product, the "dislike" score table being the transposition of the "like score table"; and randomly selects at least one other product from the "dislike" score table using the "dislike" scores as the weight bias for display to the user.

12. The apparatus of claim 10, wherein the visual browser selects at least one other product at random from one of the plurality of categories.

* * * * *